Jan. 14, 1936.   A. H. NELLEN   2,028,003

VEHICLE TIRE

Filed March 21, 1935

INVENTOR.
ARTHUR H. NELLEN
BY
ATTORNEY.

Patented Jan. 14, 1936

2,028,003

UNITED STATES PATENT OFFICE 2,028,003

VEHICLE TIRE

Arthur H. Nellen, Merion, Pa., assignor to Lee Rubber & Tire Corporation, Conshohocken, Pa., a corporation of New York Application March 21, 1935, Serial No. 12,131

10 Claims. (Cl. 152—13)

REISSUED

My invention relates to vehicle tire constructions and more particularly to an improvement in the construction of the cord fabric carcass of the tire.

In its conventional form, a pneumatic vehicle tire is composed of an inner body portion or carcass of laminated cord fabric upon which is superposed in embracing relation an outer tread body of rubber. In this cord fabric carcass, a plurality of plies of the cord fabric are arranged in superposed relation to form a laminated foundation structure of the requisite thickness. These plies, which ordinarily are four or six in number, and may be as many as sixteen, extend transversely of the tire construction from bead to bead thereof, each ply being so disposed that the cords composing the same extend at a bias or angularly across the carcass body. Also in accordance with conventional practice the several fabric plies of the carcass are each impregnated and coated with rubber in such manner and to such degree that each individual cord of each ply is imbedded in rubber to thereby prevent contact between adjoining cords in a given ply or between adjoining cords in the superposed plies.

The desiderata of a properly designed tire carcass are:—(1) flexibility sufficient to resist breakage of the fabric cords due to fatigue induced by repeated flexing thereof caused by the rolling action of the tire; (2) rigidity sufficient to withstand without undue expansion or distortion the internal air pressure to which the tire is subjected while in service; (3) strength sufficient to resist without rupture the severe shocks and blows to which the tire is constantly subjected while in use; and (4) a laminated carcass construction in which internal friction between the cords, as well as between the several cord fabric plies, is reduced to an irreducible minimum.

It is well-known to those familiar with the manufacture of tires that a tire, when subjected to the ordinary stresses and strains while in service, gradually enlarges to a certain maximum point and that after attaining this maximum degree of expansion or enlargement no further expansion takes place. Upon dissecting a tire which has thus been expanded or enlarged to its maximum degree and testing the cords thereof, it will be found that the cords in all of the carcass plies have suffered a considerable loss in elongation, while the tensile strength of the cords is not appreciably altered. If the tire is continued in service over an extended period beyond the time when it has expanded to its maximum degree and to a point where it is approaching the end of its useful life, it will be found upon dissecting the tire and testing the cords thereof that the cords in certain of the carcass plies have suffered a further loss in elongation and that the tensile strength of these cords has also been decreased considerably.

It is among the principal objects of the present invention to provide a cord fabric carcass construction wherein certain of the plies thereof will not be subject to deterioration so much more rapidly than the remaining plies that the tire will fail even though the latter plies are still in relatively excellent condition.

More specifically, this invention contemplates the provision of a cord fabric carcass construction wherein the cords of all of the plies show very little or no loss in tensile strength when the tire has approached the end of its useful life.

A further object is to provide a laminated fabric carcass the plies of which are each composed of cords of such characteristic that they show very little loss in elongation at any time during the normal life of the tire, the fabric cords being further characterized in that their loss in elongation at the end of the useful life period of the tire is approximately the same as at the time when the tire has expanded or enlarged to its maximum degree.

Still another object of my invention is to provide a cord fabric carcass construction in which the elongation and tensile strength characteristics of the cords composing a particular ply of the carcass are not materially different from those of the cords composing the other plies in consequence of which the possibility of one or more of the plies failing while the remaining plies are in relatively excellent condition is materially reduced.

The foregoing and other objects of the invention which will be apparent more fully hereinafter are obtained by the use of fabric cords characterized in that they are originally relatively stiffer, i. e., less flexible, than the standard cord ordinarily employed, at the same time that they have a lower elongation and a higher tensile strength than the standard cord.

In the accompanying drawing:—

Figure 1:
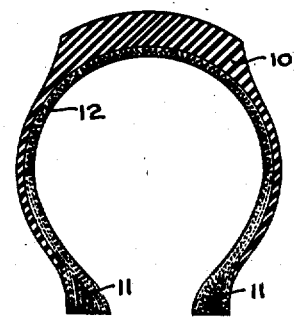
Figure 1 is a cross-sectional view of a tire constructed in accordance with and embodying the principles of the present invention.

Referring more particularly to Figure 1, it will be observed that the tire as constructed in accordance with the present invention resembles in outward appearance the conventionally constructed tire in that it comprises the tread body 10, the beads 11 and the inner carcass body 12. It is with the construction of the latter body that the present invention is concerned, the carcass body being composed of a plurality of rubber impregnated cord fabric plies superimposed one upon the other. Each of these plies is fabricated of the low stretch cord of the present invention.

Such a cord is produced by twisting the yarn into the desired cord structure by the process known as "wet twisting", or the yarns may be twisted into cord formation in the presence of a high relative humidity. I have found that when a cord of the 23—5—3 type is twisted by either of the above processes with a twist of 19.0—9.0, there is imparted to the resultant cord an exceedingly low stretch characteristic and a tensile strength higher than that of the standard 23—5—3 cord with the conventional 18—8 twist. In the designation 23—5—3, the first numeral represents the denier of the cotton yarn, the second numeral the number of such yarns twisted together to form a ply or strand, and the third numeral the number of strands twisted together to form the finished cord or cable.

I have also observed that the wet-twisted low stretch cord, as compared to the standard normal stretch cord, is of such decreased gauge that a greater yardage is obtained for a given weight thereof. Thus, in fabricating a carcass ply composed of 23 cords per inch, less weight for a given yardage is required of the low stretch cord than of the normal stretch cord. This results not only in a considerable saving in the cost of the cord of which the tire carcass is fabricated, but also in the formation of a thinner carcass ply, which latter is a result much to be desired inasmuch as it permits the several plies of the carcass structure to be impregnated with a heavier coating of rubber without increasing the overall thickness of the carcass beyond that of the conventional carcass. Consequently, in tires provided with a carcass structure of my present invention the several plies of the carcass are "lubricated" to a higher degree than has ever been possible heretofore. In addition to this, due to the decreased flexibility and elongation characteristics of the wet-twisted cords, the carcass plies fabricated thereof when superimposed upon one another to form the carcass body tend to flex more in unison with each other, the possibility of varying degrees of flexibility in the several plies being substantially eliminated. Moreover, I have found that in a carcass constructed in accordance with my present invention, the inner plies thereof do not deteriorate more rapidly than the outer plies thereof, and as a result there is no failure of the tire while the outer carcass plies are in relatively excellent condition.

Moreover, cord tests of tires embodying carcasses of my present invention very definitely show that due to the absence of any substantial differential in permissible stretch between the several plies of the carcass, less internal heat is generated between the plies, thereby insuring a cooler operation of the tire as a whole; that due to the absence of any considerable stretch in the cord of which the carcass ply is fabricated, the several plies are stiffer and lay in flatter relation to each other with a consequent reduction in the formation of objectionable waves or buckles; and that due to the stiffer character of the cord the resultant carcass is firmer and more rigid than has been possible to obtain heretofore. Also, by virtue of the reduced gauge of the cord with no corresponding reduction in tensile strength, the cord may be flexed to a much greater extent with less attending breakage thereof.

All of the foregoing is well evidenced by the following chart which tabulates the test results of a wet-twisted low stretch cord when removed from the tire for purposes of test:

|  | Tire | Ply | | | |
|---|---|---|---|---|---|
|  |  | 4th (outer) | 3rd | 2nd | 1st (inner) |
| Percent elongation at 10 lb. load before building into tire | A | 11.0 | 11.0 | 11.0 | 11.0 |
|  | B | 11.0 | 11.0 | 11.0 | 11.0 |
| Percent elongation at 10 lb. load after test | A | 6.5 | 6.5 | 6.5 | 6.5 |
|  | B | 6.5 | 6.0 | 6.0 | 6.2 |
| Elongation loss at 10 lb. load | A | 4.5 | 4.5 | 4.5 | 4.5 |
|  | B | 4.5 | 5.0 | 5.0 | 4.8 |
| Percent elongation at break before building into tire | A | 14.5 | 14.5 | 14.8 | 14.8 |
|  | B | 14.5 | 14.5 | 14.8 | 14.8 |
| Percent elongation at break after test | A | 11.5 | 11.0 | 11.0 | 11.0 |
|  | B | 11.5 | 11.0 | 11.0 | 10.5 |
| Elongation loss at break | A | 3.0 | 3.0 | 3.8 | 3.8 |
|  | B | 3.0 | 3.5 | 3.8 | 4.3 |
| Tensile strength before building into tire | A | 16.5 | 16.5 | 16.5 | 16.5 |
|  | B | 16.5 | 16.5 | 16.5 | 16.5 |
| Tensile strength after test | A | 16.5 | 16.5 | 16.0 | 15.8 |
|  | B | 16.0 | 16.5 | 15.5 | 15.0 |
| Percent loss in tensile strength | A | ----- | ----- | .5 | .7 |
|  | B | .5 | ----- | 1.0 | 1.5 |

In the foregoing chart, tire A was of the standard 6.00—16 size having a four-ply carcass constructed of the hereinbefore described special 23—5—3 carded American 1 1/16 inch low stretch cord with a 19.5—9.5 twist. This tire, when tested for endurance at an index value of 1980, showed no sign of failure at that point.

Tire B, which was identical to tire A, was also subjected to the same endurance test until it failed. However, the first sign of failure occurred at an index point of 2404. In all these tests, the index value may be translated into actual mileage which may be expected to be obtained under normal operating conditions by multiplying it by 15.

A study of the test data reveals that the tire carcass of the present invention was composed of cords having an initial elongation of 11 percent at ten pounds load. The low stretch cords of this tire showed an elongation loss at the same load of only 4.5 to 5 percent, while at breaking load, the low stretch cords showed a loss of only 3 to 4.3 percent. By reducing the permissible loss in elongation of the fabric cords, the life of the tire is materially lengthened, this being due to the fact that as the elongation loss is decreased, the differential in such loss between the cords composing the several carcass plies becomes less pronounced, in consequence of which there is little, if any, loss in tensile strength of the cords regardless of the ply in which they are present.

This conclusion is supported by a consideration of the tabulated cord tensile strength of tire B in the foregoing tabulation which shows that in this tire the tensile strength loss varied from 0.5 percent in the fourth or outermost ply to only 1.5 percent in the first or innermost ply. In other words, tire A, when tested at failure at 2404 index, not only showed a very small loss in cord tensile strength in its inner ply, but moreover showed very little difference in tensile strength of the cords composing the several plies of the tire.

Briefly summarized, the tests reveal that the several plies of a tire carcass constructed of the hereinbefore described low stretch cord are all of approximately the same tensile strength throughout the useful life of the tire and that the elongation loss of the cords composing the several plies is approximately of the same low value in all of the plies. Consequently, tires constructed in accordance with and embodying the principles of my present invention are not so readily subject to failure as are those wherein certain of the carcass plies, particularly the innermost ply, suffer deterioration more rapidly and fail sooner than the other plies the cause of which is directly attributable to pronounced differences in tensile strength and elongation loss of the cords composing different plies.

Figure 2:
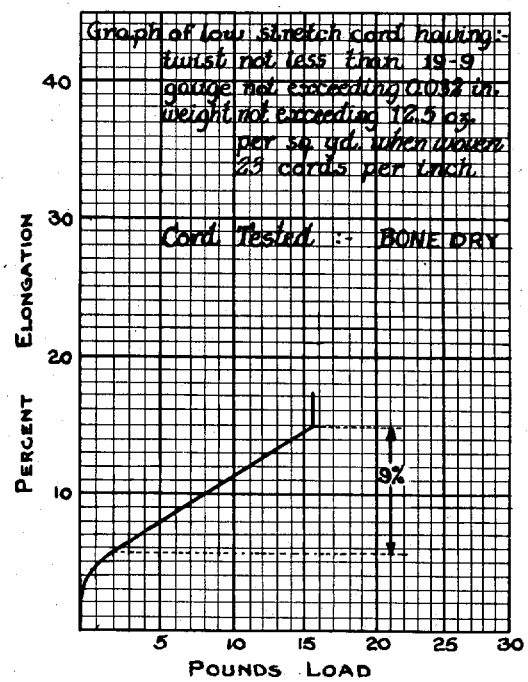
Figure 2 is a graph showing the stress-strain characteristics of the low stretch cord employed in the present invention when tested under bone-dry conditions.
Figure 3:
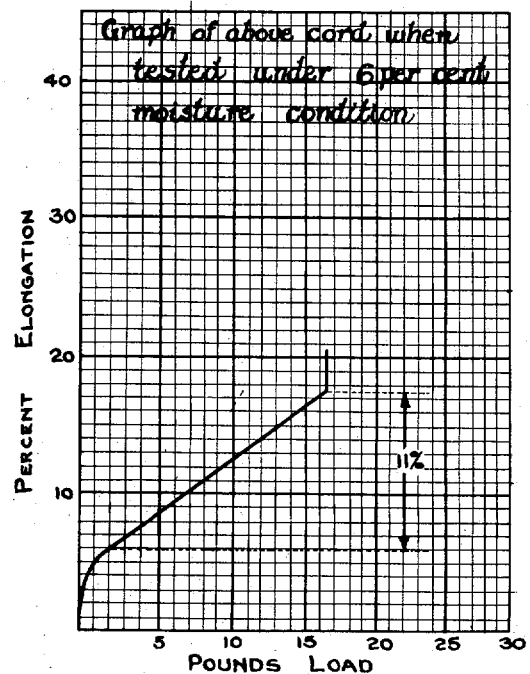
Figure 3 is a graph showing the stress-strain characteristics of the cord when tested under a 6 percent moisture condition.

The graphs of Figures 2 and 3 illustrate the elongation and tensile strength characteristics of a low stretch cord of my invention. While the cord represented in the graphs is of the 23—5—3 type, it will be understood that the graphs are applicable to cords of the other types mentioned hereinafter for relative interpretation of the stress-strain properties thereof. The graph of Figure 2 is of test data obtained with the tested cord in bone-dry condition, while the graph of Figure 3 is of corresponding data obtained with the same cord tested under a 6 percent moisture condition. In both graphs, the stress-strain curves of the low stretch cord of my present invention show relatively little elongation as the load is increased to the breaking value, the maximum elongation of the low stretch cord after the application of a 2 lb. load thereto being less than 11 percent when tested bone dry and less than 13 percent when tested with 6½ percent moisture content.

It will be understood, of course, that the present invention is not limited to cords of the more generally employed 23—5—3 construction because its principle is equally applicable to other constructions of cord employed in the tire industry. Nor is it limited to the use of the 1⅛ inch carded American staple, because I have found that 1¼ inch carded Peeler cotton as well as 1¼ inch combed Peeler cotton may likewise be used to very good effect. The essence of the invention, as defined in the appended claims, resides in the utilization of a cord having a higher than normal twist (not less than 19—9); a lower than normal gauge (not exceeding 0.032 inch) and a weight not exceeding 12.5 ounces per square yard when woven 23 cords per inch, in consequence of which it possesses elongation and tensile strength properties which are respectively of lower and higher values than those of the otherwise conventionally constructed cord. Inasmuch as the present invention is susceptible of various changes and modifications without involving a departure from the principles thereof, it is intended to claim the invention broadly, as well as specifically, as indicated in the appended claims.

What is claimed as new and useful is:

1. A cord fabric carcass ply for pneumatic tires fabricated of cords of 5/3 construction having a twist not less than 19—9, a gauge not exceeding 0.032 inch and a maximum permissible elongation of 11 percent subsequent to the application of a 2 pound load thereto when tested bone-dry and before impregnating or coating the cord with rubber compound.

2. A cord fabric carcass ply for pneumatic tires fabricated of cords of 5/3 construction having a twist not less than 19—9, a gauge not exceeding 0.032 inch, and a maximum permissible elongation of 11 percent subsequent to the application of a 2 pound load thereto when tested bone-dry and before impregnating or coating the cord with rubber compound, the maximum permissible elongation being 13 percent when the cord has a 6½ percent moisture content, the remaining factors being otherwise the same.

3. In a pneumatic tire, a cord fabric carcass embodying cords each having a predetermined maximum tensile strength with a twist of not less than 19—9 and a permissible elongation not exceeding 13 percent at ten pounds load, the said cords being further characterized in that they are each of a gauge lower than that of a cord of equal maximum tensile strength having a lower twist and higher elongation than above specified.

4. In a pneumatic tire, a cord fabric carcass therefor composed of a plurality of rubber impregnated fabric plies superimposed one upon the other, all of the plies being fabricated of cords the percentage of elongation of which is below thirteen percent at 10 pounds load when tested bone dry and before impregnating or coating with rubber compound, whereby the loss in tensile strength of the cords in the several plies when the tire approaches the end of its useful life is substantially uniform.

5. In a pneumatic tire, a cord fabric carcass therefor composed of a plurality of rubber impregnated fabric plies superimposed one upon the other, all of the plies being fabricated of cords the percentage of elongation of which is below thirteen percent at 10 pounds load when tested bone dry and before impregnating or coating with rubber compound, whereby the loss in elongation of the cords in the several plies when the tire approaches the end of its useful life is substantially uniform.

6. In a pneumatic tire, a cord fabric carcass composed of a plurality of superimposed rubber impregnated plies each fabricated of cords the percentage of elongation of which does not increase more than eleven percent as the load applied thereto is increased from two pounds to the breaking load, when tested bone dry and before impregnating or coating the same with rubber compound.

7. In a pneumatic tire, a cord fabric carcass composed of a plurality of superimposed rubber impregnated plies each fabricated of cords the percentage of elongation of which does not increase more than eleven percent as the load applied thereto is increased from two pounds to the breaking load, when tested bone dry and before impregnating or coating the same with rubber compound, and the elongation of which does not exceed thirteen percent under the same load application when tested with six and one-half percent moisture content.

8. In a pneumatic tire, a cord fabric carcass comprising a plurality of superimposed rubber impregnated plies each fabricated of cords of 5/3 construction composed of 1⅛ inch carded American cotton and having a twist not less than 19—9, a gauge not exceeding 0.032 inch and a weight not exceeding 12.5 ounces per square yard when woven 23 cords per linear inch, and which, when tested in a bone dry condition on a Scott single-strand tester with spool-type jaws, has a minimum tensile strength of 13 pounds and a maximum elongation of 11 percent at 10 pound load.

9. In a pneumatic tire, a cord fabric carcass comprising a plurality of superimposed rubber impregnated plies each fabricated of cords of 5/3 construction composed of 1¼ carded Peeler cotton and having a twist not less than 19—9, a gauge not exceeding 0.032 inch and a weight not exceeding 12.5 ounces per square yard when woven 23 cords per linear inch, and which, when tested in a bone dry condition on a Scott single-strand tester with spool-type jaws, has a minimum tensile strength of 15 pounds and a maximum elongation of 11 percent at 10 pound load.

10. In a pneumatic tire, a cord fabric carcass comprising a plurality of superimposed rubber impregnated plies each fabricated of cords of 5/3 construction composed of 1¼ combed Peeler cotton and having a twist not less than 19—9, a gauge not exceeding 0.032 inch, and a weight not exceeding 12.5 ounces per square yard when woven 23 cords per linear inch, and which, when tested in a bone dry condition on a Scott single-strand tester with spool-type jaws, has a minimum tensile strength of 16½ pounds and a maximum elongation of 11 percent at 10 pound load.

ARTHUR H. NELLEN.

Certificate of Correction

Patent No. 2,028,003. January 14, 1936.

ARTHUR H. NELLEN.

It is hereby certified that error appears in the printed specification of the above numbered patent requiring correction as follows: Page 3, first column, line 53, for the fraction "1⅛" read $1\frac{1}{16}$; and that the said Letters Patent should be read with this correction therein that the same may conform to the record of the case in the Patent Office.

Signed and sealed this 31st day of March, A. D. 1936.

[Seal]

LESLIE FRAZER,
*Acting Commissioner of Patents.*

American cotton and having a twist not less than 19—9, a gauge not exceeding 0.032 inch and a weight not exceeding 12.5 ounces per square yard when woven 23 cords per linear inch, and which, when tested in a bone dry condition on a Scott single-strand tester with spool-type jaws, has a minimum tensile strength of 13 pounds and a maximum elongation of 11 percent at 10 pound load.

9. In a pneumatic tire, a cord fabric carcass comprising a plurality of superimposed rubber impregnated plies each fabricated of cords of 5/3 construction composed of 1¼ carded Peeler cotton and having a twist not less than 19—9, a gauge not exceeding 0.032 inch and a weight not exceeding 12.5 ounces per square yard when woven 23 cords per linear inch, and which, when tested in a bone dry condition on a Scott single-strand tester with spool-type jaws, has a minimum tensile strength of 15 pounds and a maximum elongation of 11 percent at 10 pound load.

10. In a pneumatic tire, a cord fabric carcass comprising a plurality of superimposed rubber impregnated plies each fabricated of cords of 5/3 construction composed of 1¼ combed Peeler cotton and having a twist not less than 19—9, a gauge not exceeding 0.032 inch, and a weight not exceeding 12.5 ounces per square yard when woven 23 cords per linear inch, and which, when tested in a bone dry condition on a Scott single-strand tester with spool-type jaws, has a minimum tensile strength of 16½ pounds and a maximum elongation of 11 percent at 10 pound load.

ARTHUR H. NELLEN.

Certificate of Correction

Patent No. 2,028,003.   January 14, 1936.

ARTHUR H. NELLEN.

It is hereby certified that error appears in the printed specification of the above numbered patent requiring correction as follows: Page 3, first column, line 53, for the fraction "1⅛" read $1\frac{1}{16}$; and that the said Letters Patent should be read with this correction therein that the same may conform to the record of the case in the Patent Office.

Signed and sealed this 31st day of March, A. D. 1936.

[Seal]

LESLIE FRAZER,
*Acting Commissioner of Patents.*